United States Patent [19]

Hattori

[11] 3,946,943

[45] Mar. 30, 1976

[54] COOLING SYSTEM OF AN INTERNAL COMBUSTION ENGINE INCORPORATING A BY-PASS FLOW CONTROL SYSTEM

[75] Inventor: Kyo Hattori, Toyota, Japan

[73] Assignee: Toyota Jidosha Kogyo Kabushiki Kaisha, Japan

[22] Filed: Jan. 24, 1975

[21] Appl. No.: 543,893

[30] Foreign Application Priority Data
Oct. 8, 1974  Japan.................. 49-121389[U]

[52] U.S. Cl. ............ 236/34.5; 123/41.1; 165/35; 165/51; 236/100
[51] Int. Cl.² ............................................. F01P 7/02
[58] Field of Search ....... 236/34, 34.5, 100; 165/35, 165/51; 123/41.09, 41.1

[56] References Cited
UNITED STATES PATENTS

| | | |
|---|---|---|
| 2,173,059 | 9/1939 | Mackintosh .................. 236/34.5 |
| 2,244,932 | 6/1941 | Anderson ...................... 236/34.5 |
| 2,326,096 | 8/1943 | Dillman ........................ 123/41.1 |
| 2,867,383 | 1/1959 | Drapeau ....................... 236/34.5 |
| 2,982,477 | 5/1961 | Drapeau ....................... 236/34.5 |
| 3,255,740 | 6/1966 | Walsh ........................... 236/34.5 |
| 3,313,483 | 4/1967 | Nallinger ...................... 236/34.5 |

Primary Examiner—Charles J. Myhre
Assistant Examiner—Daniel J. O'Connor
Attorney, Agent, or Firm—Stewart and Kolasch, Ltd.

[57] ABSTRACT

A cooling system of an internal combustion engine including a by-pass circuit which leads a flow of cooling water to by-pass a radiator, said cooling system incorporating a thermostat valve operated by a wax cylinder, wherein a second valve port is provided at a housing of the thermostat valve, said second valve port being formed as a cylindrical bore adapted to receive said wax cylinder when it has been biased in a direction to open the thermostat valve, said by-pass circuit being led through said second valve port.

3 Claims, 2 Drawing Figures

3,946,943

COOLING SYSTEM OF AN INTERNAL COMBUSTION ENGINE INCORPORATING A BY-PASS FLOW CONTROL SYSTEM

BACKGROUND OF THE INVENTION

1. Field of the Invention:

This invention relates to a cooling system of an internal combustion engine and, more particularly, an improvement in the control of said control system.

2. Description of the Prior Art:

In most conventional cooling systems of internal combustion engines, there is incorporated a by-pass circuit which allows for a circulating flow of a part of cooling water to by-pass a radiator in order to improve the warming-up performance of the engine. Furthermore, it is also practiced to lead the by-pass circuit through an intake manifold to heat up the intake manifold more rapidly during the warming up period of the engine so that the ignition of fuel air mixture is improved. In operation, when a larger amount of cooling water is passed through the by-pass circuit, a better warming up performance of the engine is obtained, while in this case, the engine shows a tendency to be overheated in the normal operation after the warming up. Furthermore, in the case of the structure where the intake manifold is heated up by the by-pass circuit, there is a problem in that the engine performance lowers in high speed operation. Thus, in view of these drawbacks, a limit has been imposed upon the amount of flow through the by-pass circuit.

SUMMARY OF THE INVENTION

Therefore, it is an object of this invention to solve the abovementioned problems and to provide a cooling system in which the amount of flow through the by-pass circuit is increased while the engine is at low temperature and is positively and stably reduced to a predetermined rate when the engine has been warmed up, without employing any particular additional device for the control of the flow amount through the by-pass circuit.

According to this invention, the abovementioned object is accomplished by a cooling system of an internal combustion engine comprising a main cooling water flow circuit which connects a water jacket of the engine with a radiator, a by-pass circuit which allows for a flow of cooling water to by-pass said radiator, and a thermostat valve incorporated in said main cooling water flow circuit and adapted to open or close so as to uninterrupt or interrupt said main cooling water flow circuit in response to high or low temperature of the cooling water, said thermostat valve having a wax cylinder and a valve member which is driven by said wax cylinder when said cylinder is biased due to melting or solidifying of wax contained in said cylinder, characterized by a second valve port formed as a cylindrical bore adapted to receive said wax cylinder when said cylinder has been biased in a direction to open said thermostat valve, said by-pass circuit being led through said second valve port.

The main cooling water flow circuit which connects a water jacket of the engine with a radiator generally incorporates therein a thermostat valve which is adapted to open or close according to the temperature of cooling water, said thermostat valve operating to close and interrupt the main cooling water flow circuit in a cold engine condition where the temperature of cooling water is below a predetermined level and to open and uninterrupt the main cooling water flow circuit when the engine has been warmed up to a predetermined temperature. This invention proposes to utilize the thermostat valve for the control of the by-pass flow through the by-pass circuit according to the warming up condition of the engine and, actually, provides for a control of said second valve port for the by-pass circuit by the wax cylinder of the thermostat valve.

By the abovementioned constitution that the thermostat valve is of a wax cylinder type and the wax cylinder is inserted into said second valve port formed as a cylindrical bore when the thermostat valve is opened, said second valve port is positively and stably constricted to a predetermined rate so as to accomplish the reduction of by-pass flow to a predetermined flow rate when the temperature of cooling water has been raised to a predetermined level with a result that the wax cylinder is biased by a predetermined amount.

According to a particular feature of this invention, said wax cylinder may preferably be guided so as to move along its axis when it is biased, said axis substantially coinciding with an axis of said cylindrical bore. By this arrangement, smooth cooperation of said wax cylinder with said cylindrical bore is obtained while maintaining a constant clearance therebetween and, accordingly a constant constricting flow passage for the by-pass circuit.

According to another particular feature of this invention, said wax cylinder, when it has been biased, may preferably be inserted into said cylindrical bore so much that the passage area through said second valve port is principally determined by the balance of the cross sectional areas of said cylindrical bore and said wax cylinder. By this arrangement, the constricting rate of the by-pass circuit when the engine is in a warmed up condition is stably maintained regardless of some fluctuations in the temperature of cooling water, such fluctuations being unavoidable in actual operation of the engine due to changes of running condition, atmospheric temperature, etc.

BRIEF DESCRIPTION OF THE DRAWING

In the accompanying drawing.

DESCRIPTION OF THE PREFERRED EMBODIMENT

In the following, this invention will be described in more detail of a preferred embodiment with reference to the accompanying drawing.

Figure 1:
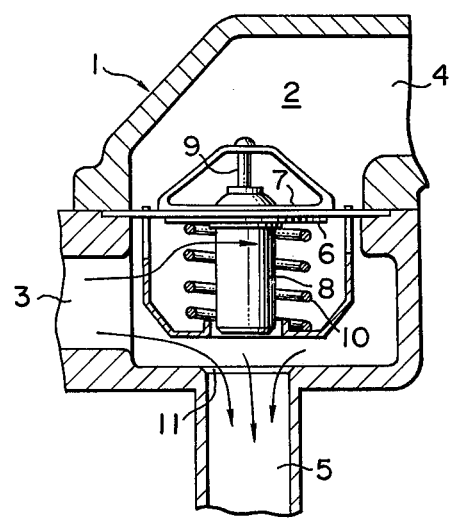
FIGS. 1 and 2 show the structure of a thermostat valve in a cooling system of an internal combustion engine incorporating an embodiment of this invention, wherein the two FIGS. show different operating conditions of the valve in a longitudinal section thereof.
Figure 2:
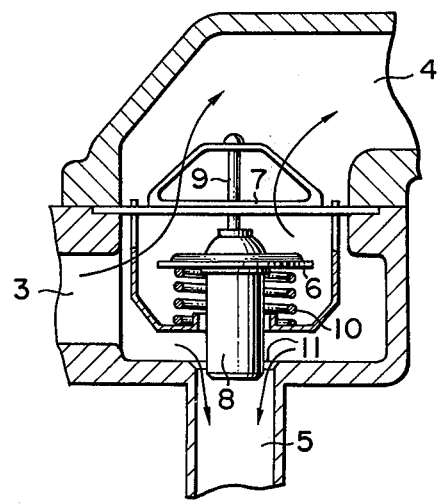

Referring to the drawing, wherein FIG. 1 shows a condition when the temperature of cooling water of an engine is low and the thermostat valve is closed, while FIG. 2 shows a condition when the cooling water has been heated up to a predetermined temperature and the thermostat valve is opened, 1 designates a valve housing which defines a valve chamber 2 therein. In this valve chamber there opens a cooling water inlet passage 3 which leads cooling water from a water jacket (not shown) of the engine, a cooling water outlet passage 4 which sends out cooling water to a return passage of a main cooling water flow circuit connected to the water jacket through a radiator (not shown) and a cooling water outlet passage 5 which sends out cooling water to a return passage of a by-pass circuit connected to the water jacket without passing through the radiator. 6 and 7 designate a valve member and a valve seat, respectively, which cooperate to uninterrupt or interrupt a flow passage extending from the inlet passage 3 to the outlet passage 4. In the shown structure, the valve member 6 is carried by a wax cylinder 8 containing wax therein and is adapted to be held at a position where it sits upon the valve seat 7 as shown in FIG. 1 when said wax is at a low temperature and solidified to present a relatively small volume, and to be removed from the valve seat 7 to connect the inlet passage 3 with the outlet passage 4 due to biasing of the wax cylinder 8, said biasing being effected by a counteraction of a piston rod 9, when the wax has been heated up and melted to present an increased volume. 10 is a compression coil spring. Confronting the wax cylinder 8 of the thermostat valve, there is provided a second valve port 11 formed as a cylindrical bore, through which the cooling water outlet passage 5 forming a part of the by-pass circuit is led. The valve port 11 is arranged so that it is located apart from the wax cylinder 8 to leave itself as opened as shown in FIG. 1 when the temperature of cooling water is low, with the valve member 6 abutting onto the valve seat 7 to close the thermostat valve, wherein the by-pass flow passage extending from the inlet passage 3 to the outlet passage 5 is sufficiently opened. To the contrary, when the engine has been warmed up with the cooling water heated up beyond a predetermined temperature with a result that the thermostat valve is opened as shown in FIG. 2, the wax cylinder 8 is inserted into the valve port 11, whereby the by-pass flow passage extending from the inlet passage 3 to the outlet passage 5 is constricted to a rate determined by the cross sectional areas of the cylindrical bore forming the port 11 and the wax cylinder 8.

From the foregoing, it will be appreciated that, according to this invention, it is only necessary to provide a second valve port formed as a cylindrical bore at a portion of the valve housing of the thermostat valve in a conventional cooling system of an internal combustion engine, said thermostat valve being equipped with a wax cylinder, so that a by-pass circuit is led through said second valve port, whereby a cooling system incorporating a by-pass flow control system which controls the amount of by-pass flow positively and stably in accordance with the warming up condition of the engine, is obtained in a very simple structure without requiring any additional thermostat valve or complicated structure for the control of the by-pass circuit.

I claim:

1. A cooling system of an internal combustion engine comprising a main cooling water flow circuit which connects a water jacket of the engine with a radiator, a by-pass circuit which allows for a flow of cooling water to by-pass said radiator, and a thermostat valve incorporated in said main cooling water flow circuit and adapted to open or close so as to uninterrupt or interrupt said main cooling water flow circuit in response to high or low temperature of the cooling water, said thermostat valve having a wax cylinder and a valve member which is driven by said wax cylinder when said cylinder is biased due to melting or solidifying of wax contained in said cylinder, characterized by a second valve port formed as a cylindrical bore means adapted to receive said wax cylinder when said cylinder has been biased in a direction to open said thermostat valve, said by-pass circuit being led through said second valve port.

2. A cooling system according to claim 1, wherein said wax cylinder is guided so as to move along its axis when it is biased, said axis substantially coinciding with an axis of said cylindrical bore.

3. A cooling system according to claim 1, wherein said wax cylinder, when it has been biased, is inserted into said cylindrical bore so much that the passage area through said second valve port is principally determined by the balance of the cross sectional areas of said cylindrical bore and said wax cylinder.

* * * * *